March 30, 1965    L. KASPARIAN    3,176,311
MOTION PICTURE PRODUCTION WITH CONTROLLED ASPECT RATIO
Filed Sept. 6, 1960
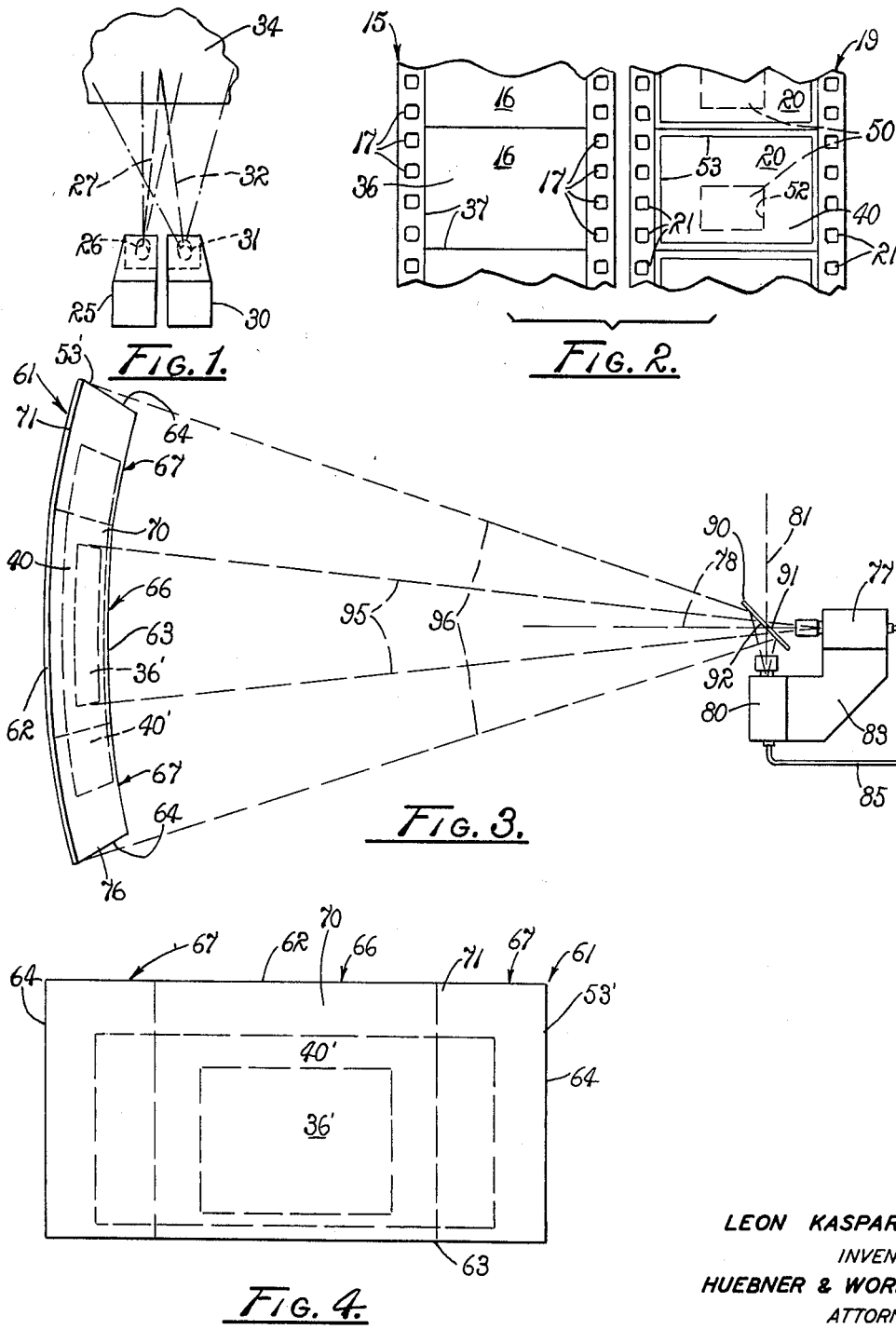
LEON KASPARIAN
INVENTOR
HUEBNER & WORREL
ATTORNEYS
BY
Richard M. Worrel

United States Patent Office 3,176,311
Patented Mar. 30, 1965

3,176,311
MOTION PICTURE PRODUCTION WITH
CONTROLLED ASPECT RATIO
Leon Kasparian, 3460 Liberty Ave., Fresno, Calif.
Filed Sept. 6, 1960, Ser. No. 54,137
1 Claim. (Cl. 352—38)

The present invention relates to a method and apparatus for controlling the aspect ratio in the production of motion pictures and, more particularly, to the preparation and subsequent projection of relatively narrow angle inner scenes and relatively wide angle outer scenes corresponding to and surrounding the inner scenes and wherein the inner and outer scenes are relatively variable in size thereby enabling variation of the aspect ratio of the motion pictures viewed. By aspect ratio is meant the ratio of the width to the height of a projected image.

For many years, commercial motion pictures were almost universally produced with a relatively narrow aspect ratio of 1.33 to 1. More recently, however various wide angle or wide screen systems, such as Cinerama, CinemaScope, and the like, have been developed and brought into popular usage. These systems either simulate or actually increase the aspect ratio of the scenes viewed on the movie screen.

Wide screen systems attempt to present to the viewer a reproduction of the photographed scene approaching that which would be visible to the viewer at the site of the original photography. Emphasis is on the side peripheral content of the photographed scenes. The peripheral view is not normally captured by narrow angle photography and does lend realism to the motion pictures.

However, there are certain advantages of narrow or more restricted viewing angles which are lost in the wide screen systems. Thus, the classical closeup shots exhibiting highly personal drama or object emphasis have been depreciated in their effectiveness whenever an attempt has been made to use them in the wide pictorial expanses of wide screen systems. For example, the image of a telephone, or other relatively small object, occupying the full screen width of a CinemaScope screen, often in excess of thirty feet, may be somewhat difficult for a viewer to accept realistically. This is especially so if such a scene is preceded by a scene of a room also fully occupying the screen. Accordingly, such unrealistic exaggerations in size are usually avoided in current motion picture wide screen systems.

The essence of the present invention, therefore, is to retain the advantages of both narrow and wide angle systems by providing for simultaneous projection of inner and outer scenes wherein the latter completely circumscribes or surrounds the former and is adapted to affect, emotionally or otherwise, the scene circumscribed and whereby controlled variation in the aspect ratio is facilitated. The subject system is commercially identified as the "Controlled And Projected Motion Picture Screen Surround."

Accordingly, it is an object of the present invention to facilitate control of the aspect ratio in the production of motion pictures.

Another object is to provide a system of motion picure production which has advantages of both wide and narrow screen systems while eliminating certain disadvantages thereof.

Another object is to surround a narrow angle, inner or central motion picture scene with a wide angle, outer or peripheral scene which has an effect, pictorially, emotionally, or otherwise on the inner scene.

Another object is to produce motion pictures with such inner and outer scenes wherein the content of corresponding inner and outer scenes is selected as desired to achieve a desired visual effect.

Another object is simultaneously and synchronously to project onto a common screen an outer scene having a masked central portion, and an inner scene precisely occupying the masked out portion of the outer scene.

Another object is to provide a system of the type described wherein such inner and outer scenes are photographed separately or simultaneously, said scenes being of the same or different subject matters, and wherein corresponding inner and outer scenes are subsequently correlated in the preparation of the motion picture film prior to projection.

Another object is to provide a motion picture system of the type described which can be produced with properly adapted standard equipment and which motion pictures are readily adaptable for exhibition in theaters employing conventional projection apparatus allowing only for the standard aspect ratio.

These, together with other objects, will become more fully apparent upon reference to the following description and accompanying drawing.

In the drawing:

FIG. 1 is a perspective diagrammatic view of photographic apparatus, illustrating certain principles of the present invention related to a scene being photographed and indicating photographic angles of view and optical axes.

FIG. 2 is a fragmentary face view of a pair of motion picture films of the type employed in the apparatus in FIG. 1 and illustrating a masked out portion on one of the films.

FIG. 3 is a top plan view of a projection apparatus and a perspective view of a projection screen, both illustrating principles of the present invention, and with optical axes, projected light rays, an inner scene on the screen, and dividing lines between sections of the screen all being shown in dashed lines.

FIG. 4 is a front elevation of the screen shown in FIG. 3 with an inner scene, as provided by the present invention, and dividing lines between sections of the screen represented in dashed lines.

As an aid to obtaining a better understanding of the subsequent description of the invention, certain steps included in the method of the instant invention are:

(1) Photographing narrow angle inner or central scenes on successive frames of a first film.

(2) Photographing relatively wide angle, outer or peripheral scenes on successive frames of a second film and either simultaneously with, or separately of said narrow angle photography.

(3) Selectively masking the scenes.

(4) Simultaneously projecting the inner and outer scenes with the outer scene surrounding the inner scene.

Photography

With reference to the drawings, a first film 15 is partially illustrated in FIG. 2. For purposes of subsequent reference, it is to be noted that the film includes a plurality of frames 16 and sprocket holes 17, all in a well-known manner. A second film 19, preferably of the same size, also has frames 20 and sprocket holes 21.

As illustrated in FIG. 1, a first camera 25, adapted to be loaded with the first film 15 in unexposed condition, includes a lens, generally indicated by the numeral 26. The lens has an optical axis 27 centrally located within the photographic field of the camera. A second camera 30, adapted to be loaded with the second film 19, has a lens, indicated at 31, providing an optical axis, indicated by the numeral 32. The foregoing apparatus is employed in carrying out the first two steps of the subject invention, as outlined above, and as more fully described below.

Two different methods of photography are used in the present invention. A first method is designated "Separately Controlled Photography." In this type of photography, the cameras 25 and 30 are physically separate from each other. With the first film 15 loaded in the first camera 25, said camera is operated and the film is exposed to a predetermined subject or subjects, as 34, whereby inner scenes 36 having marginal edges 37 are provided on the successive frames 16 of the first film. Normally, as with standard motion picture production, the successive scenes constitute the motion picture story or action.

With the second film 19 loaded in the second camera 30, and although not illustrated, the latter is employed to photograph outer scenes 40 which may include changing light intensities, color intensities, visual tones, animations, still or moving designs, sharp or defocused picture images, or any photographable, visual phenomena which artistically and/or psychologically augments, enhances, depresses, or otherwise affects, the scenes photographed on the first film 15. For example, the inner scene depicting the action may be a hot desert scene. In order to emphasize heat the outer scene may be changing shades or gradations of red. It is evident that the films 15 and 19 are exposed entirely separately of each other since, as described, the subject matters are distinct although perhaps related. If preferred, however, and as illustrated in FIG. 1, the second camera photographs on the second film the same subject matter being photographed by the first camera either simultaneously therewith or separately and from the same or different position as the first camera.

A second method of photography according to the present invention is designated "Combined" or "Total Field Synchronous Photography" in which the cameras 25 and 30 are mounted on a common frame, not shown, in predetermined fixed relation to each other. The camera lenses 26 and 31 share a common optical axis by means of beam splitting techniques well-known in the art. Both cameras are controlled and driven in synchronization so as not to exceed a variation of more than one frame difference in speed, except, of course, where greater variation is desired.

The films 15 and 19 are loaded into the first and second cameras 25 and 30, as before. Because of the physical interconnection of the cameras, both cameras are directed generally toward the same scene, as 34 in FIG. 1. However, the lens 31 of the second camera has a focal length of approximately one-half, or less than one-half, of the focal length of the lens 26 of the first camera. For example, if the first camera utilizes a one hundred millimeter lens, the second camera employs a lens of fifty millimeters or twenty-five millimeters. The precise ratio between the focal lengths of the lenses employed depends on the aspect ratio desired as well as on the selection of the film director. It is evident that the first camera photographs a narrow angle of view resulting in an inner scene 36 on the first film 15 while the second camera photographs a relatively wide angle of view resulting in the outer scene 40 on the second film 19. Since both cameras are photographing generally the same scene, the scenes on the first film are in effect cropped and enlarged central portions of the wider scenes on the second film.

The photography can be accomplished with or without anamorphism of the inner scenes 36. However, anamorphing of the outer scenes 40 is necessary and may be introduced during optical printing as well as during photography.

Masking

After the photography is complete, and irrespective of which method of photography is used, the films 15 and 19 are edited and prepared for projection. For this purpose reference is made to FIG. 2. The films are positioned in side-by-side relation with corresponding inner and outer scenes 36 and 40 opposite to each other. The frames 20 of the second film 19 are centrally masked by photographically printing opaque, rectangular masking portions, represented by the numeral 50, of appropriate size and shape onto selected frames of the second film. These masking portions are of the precise shape of corresponding inner scenes 36 on the frames 16 of the first film. Therefore, the resultant outer scene has an inner edge 52 and an outer edge 53. However, the center of the masked out portion is preferably located on the vertical center-line of the scene and is spaced approximately one-third of the vertical dimension of the scene from the lower edge of the scene. Thus, in the cited example, a central portion of the scene of red color is masked out to accommodate the desert scene. It is clearly evident that the masked portions on the outer scenes must be related to their corresponding inner scenes. Although the inner scene and masked out portion illustrated in FIG. 2 are rectangular, it is to be understood that matte shape is not restricted to a rectangle but can be of any desired shape or aspect ratio. In some instances, the entire outer scene may be masked out if object emphasis is desired on the inner scene. For example, where the outer scene is simply the periphery of the inner scene, close-ups of persons or objects may be given true perspective in the narrower conventional aspect ratio while the then distracting effect of the peripheral view is eliminated. Conversely, the entire inner scene may be masked out to create a special emotional effect with an expansive wide angle scene or simply to fill the screen with changing light values, or other abstraction. It is evident, therefore, that the final composite picture is entirely at the discretion of its creator and the aspect ratio can be changed from scene to scene, as desired.

Projection

The projection apparatus employed in carrying out the fourth step of the present invention is illustrated in FIGS. 3 and 4. This apparatus includes a high gain, relatively wide projection screen 61 adapted to be mounted in the usual location in a motion picture theater. The screen is substantially rectangular having upper and lower edges 62 and 63 and opposite, vertical side edges 64. The screen has a central section 66 which is substantially planar and a pair of side sections 67 which curve gradually rearwardly and outwardly from the central section to the side walls of the theater, or other enclosure. The screen has a front projection surface 70 preferably having a shaded band 71 adjacent to its upper, lower, and side edges. The band is wider at the upper and side edges than along the lower edge. The band is darkest at the outer edges and gets progressively lighter toward the center section, the latter being centrally provided with the highest white reflectance the surface is capable of reflecting. Assuming that the screen is approximately one-hundred feet wide by fifty feet high, yielding a maximum aspect ratio of two to one, the band 71 is preferably no wider than ten feet adjacent to the upper and side edges and not more than three feet adjacent to the lower edge.

A first projector 77 has a lens, not shown, with an optical axis of projection, generally indicated by the numeral 78. A second projector 80 has an optical axis of projection, generally indicated by the numeral 81. A common frame 83 rigidly interconnects the projectors with their axes of projection in angular relation to each other, this angular relationship being perpendicular in the embodiment illustrated in FIG. 3. The projectors are interconnected by a common driving and synchronizing coupling, generally indicated by the numeral 85.

The projectors 77 and 80 are positioned in outwardly spaced relation to the front surface 70 of the screen 61 with the axis of the first projector substantially normal to the screen. It is to be noted that the horizontal radius of curvature of the screen is not to be less than twice the projection throw, as defined by the distance between the center of the screen and the projectors.

A substantially flat, light intercepting plate 90 is mounted in oblique relation to the axes 78 and 81 of projection of both of the projectors and at a substantially 45° angle therewith, assuming that the axes of the projection are perpendicular to each other, as described above. The intercepting plate thus has a first surface 91 disposed generally toward the first projector and a second surface 92 generally facing the second projector. The plate is characterized by its ability to transmit light rays, generally indicated at 95, from the first projector directly through the plate to the screen 61. However, the plate reflects light rays, as 96, impinging on the surface 92 from the second projector and thereby reflects these light rays forwardly onto the projection screen.

In carrying out the fourth step of the subject invention, as initially outlined above, the first and second projectors 77 and 80 are loaded with the previously processed first and second films 15 and 19, respectively. The projectors are simultaneously energized and synchronously driven so as to project outer and inner scenes 40' and 36', corresponding to the scenes 40 and 36 on the films, onto the screen 61. Normally, the lumen brightness of the projector apertures is such that upon the screen, the inner and outer scenes are nearly equal in incident light value. However, the second projector is seldom permitted to produce brightness greater than that from the first projector. The focal length of the lens, not shown, of the first or key projector is selected and suitable anamorphism introduced so that the outer margin 53' of the outer scene 40' is coincident with the upper, lower, and side edges 62, 63 and 64 of the screen and so that the masked out portion 50 is positioned within the central section 66 of the screen. Further, the lens of the second projector is selected to project the inner scene 36' into said masked portion. Preferably, the center of this inner scene 36' is offset below the center of the screen but in a common vertical plane therewith; stated otherwise, the projection axis of the first projector is concentric to the screen but the projection axis of the second projector is located one-third the height of the screen up from the lower edge 63 and in a common vertical plane with the first projector's axis. When projected in this manner, the outer scene precisely circumscribes the inner scene. Because the outer scenes have been previously masked, the masked out subject matter originally photographed in the outer scenes does not dilute, or otherwise interfere with, the inner scene which replaces the masked out subject matter.

Preferably, the projectors 77 and 80 are driven together by mechanical or electrical synchronization so as not to vary more than one-twenty-fourth of a second between their respective frame pull-down cycles, assuming normal projection speed of twenty-four frames per second. This assures corresponding inner and outer scenes 36 and 40 to be simultaneously projected onto the screen 61. As previously explained, the outer scenes have a visual effect on the inner scenes so that synchronization is highly important to the success of the subject invention.

From the foregoing, it is evident that a method and apparatus has been provided which enables control of the aspect ratio of motion pictures by an inter-relation of inner and outer scenes wherein the outer scene as projected surrounds the inner scene and has a visual effect thereon. The subject matter of the outer scenes may include subtle or exaggerated light modulations, blurred or sharp picture images, controlled color fields in a wide angle of view and serving as peripheral excitation of the inner projected scene. Thus the viewer is brought into a closer emotional involvement with the inner scene or picture because the outer scenes add more realism and depth to the inner scenes. Additionally, the subject system is suitable for use with conventional motion picture equipment. Further, not only can old motion pictures be adapted to the subject system by adding outer surround scenes thereto but the inner scenes photographed in connection with the present invention can be separately viewed without the outer scenes and on screens with a narrow aspect ratio.

Although the invention has been herein shown and described in what is conceived to be the most practical and preferred method and apparatus, it is recognized that departures may be made therefrom within the scope of the invention, which is not to be limited to the details disclosed herein but is to be accorded the full scope of the claim so as to embrace any and all equivalent methods and apparatus.

Having described my invention, what I claim as new and desire to secure by Letters Patent is:

A method of presenting a composite motion picture comprising photographing a relatively narrow angle central scene on successive frames of a first strip film, photographing a relatively wide angle peripheral scene on successive frames of a second strip film, masking directly on the film peripheral areas of the successive frames of the first strip film progressively to vary the size, shape and/or aspect ratio thereof, masking directly on the film central areas of the successive frames of the second strip film so that the masked areas of the second strip film successively match the unmasked areas of the corresponding frames of the first strip film, and simultaneously and synchronously projecting corresponding frames of the strip films through respective first and second projectors onto a common screen so that the images from the second strip film surround and are fitted to the images of the first strip film to provide a co-ordinate and unitary visual effect.

References Cited by the Examiner

UNITED STATES PATENTS

| | | | |
|---|---|---|---|
| 1,156,896 | 10/15 | Garrette | 88—24 |
| 1,394,797 | 10/21 | Smith | 88—24 |
| 1,461,131 | 7/23 | Marten | 88—24 |
| 1,806,452 | 5/31 | Fulgora | 88—24 |
| 1,894,265 | 1/33 | Chretien | 88—24 |
| 1,897,494 | 2/33 | Mitchell et al. | 96—42 |
| 2,150,165 | 3/39 | Holman | 352—60 |
| 2,164,770 | 7/39 | Gregory | 352—89 |
| 2,334,962 | 11/43 | Seitz | 352—47 |
| 2,558,660 | 6/51 | Mullen | 352—201 |
| 2,651,233 | 9/53 | Tondreau | 95—18 |
| 2,660,087 | 11/53 | Domeshek | 88—24 |
| 2,737,082 | 3/56 | Dowling | 352—85 |

FOREIGN PATENTS 532,549   11/56   Canada.

JULIA E. COINER, *Primary Examiner.*

D. H. RUBIN, EMIL G. ANDERSON, NORTON ANSHER, *Examiners.*